G. SPENCE.
SAFETY RAILWAY APPLIANCE.
APPLICATION FILED DEC. 8, 1916. RENEWED SEPT. 23, 1919.

1,325,419.

Patented Dec. 16, 1919.
8 SHEETS—SHEET 1.

Fig. 1.

Inventor
Gideon Spence

Witnesses
F. C. Gibson.
K. Peacock.

By Victor J. Evans
Attorney

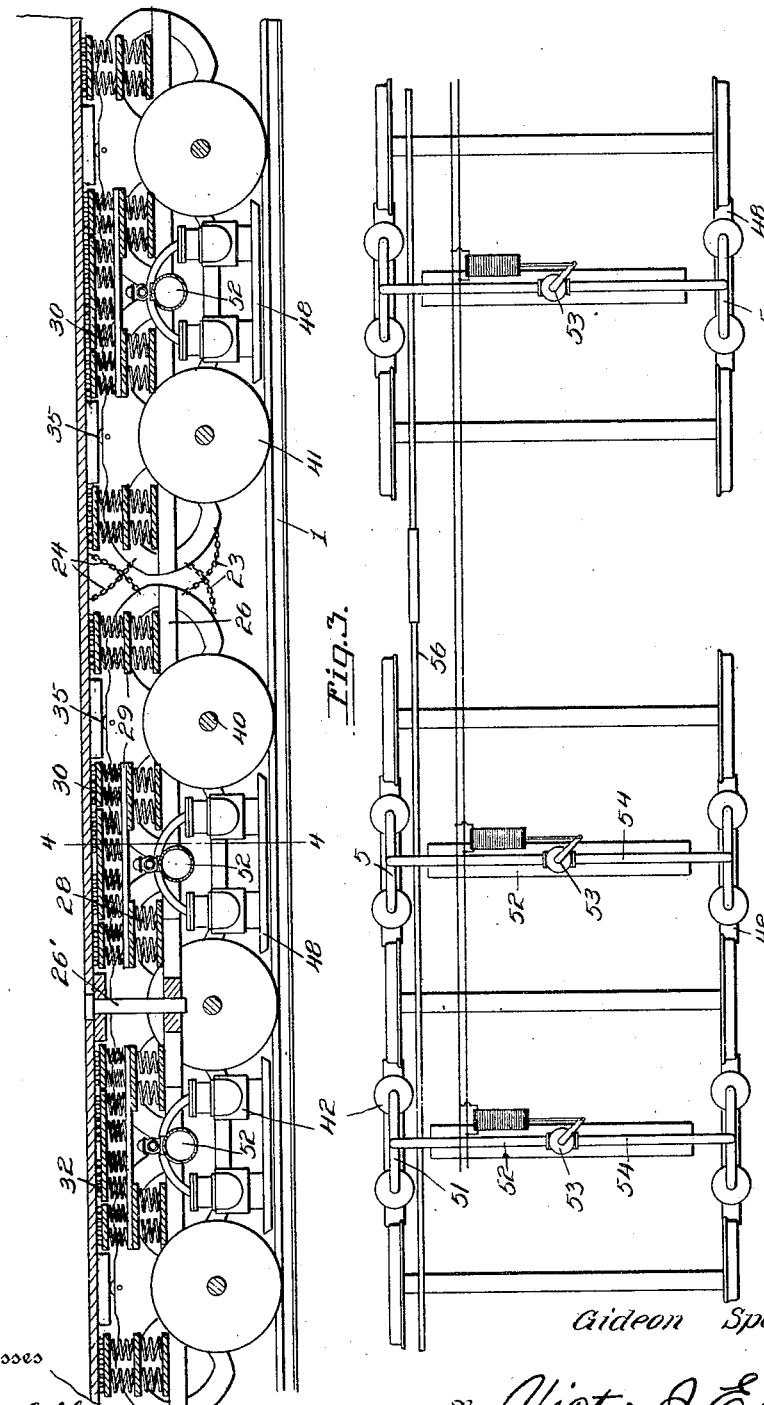

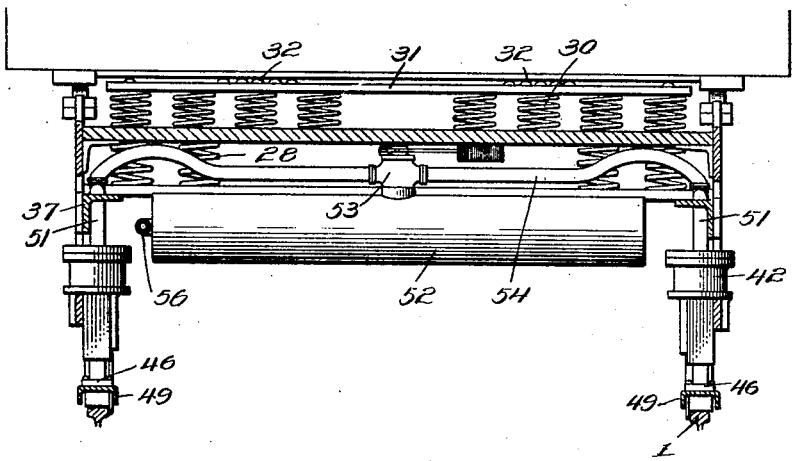
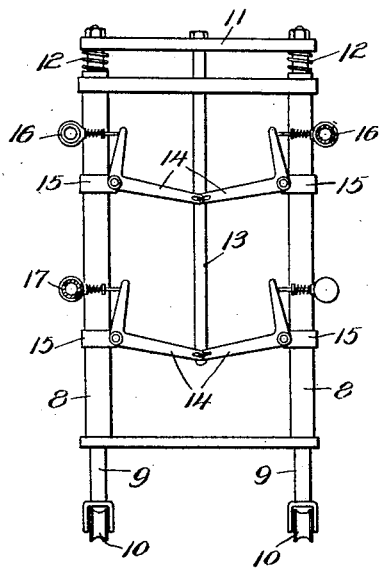

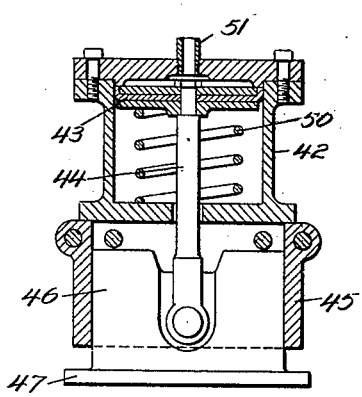
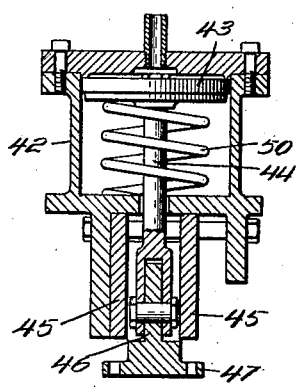
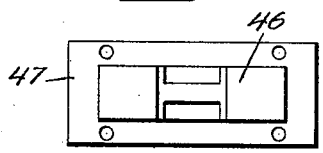
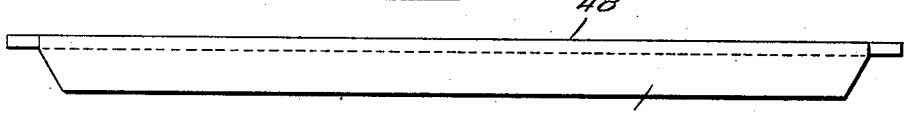
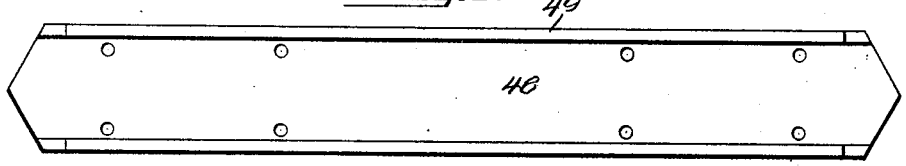

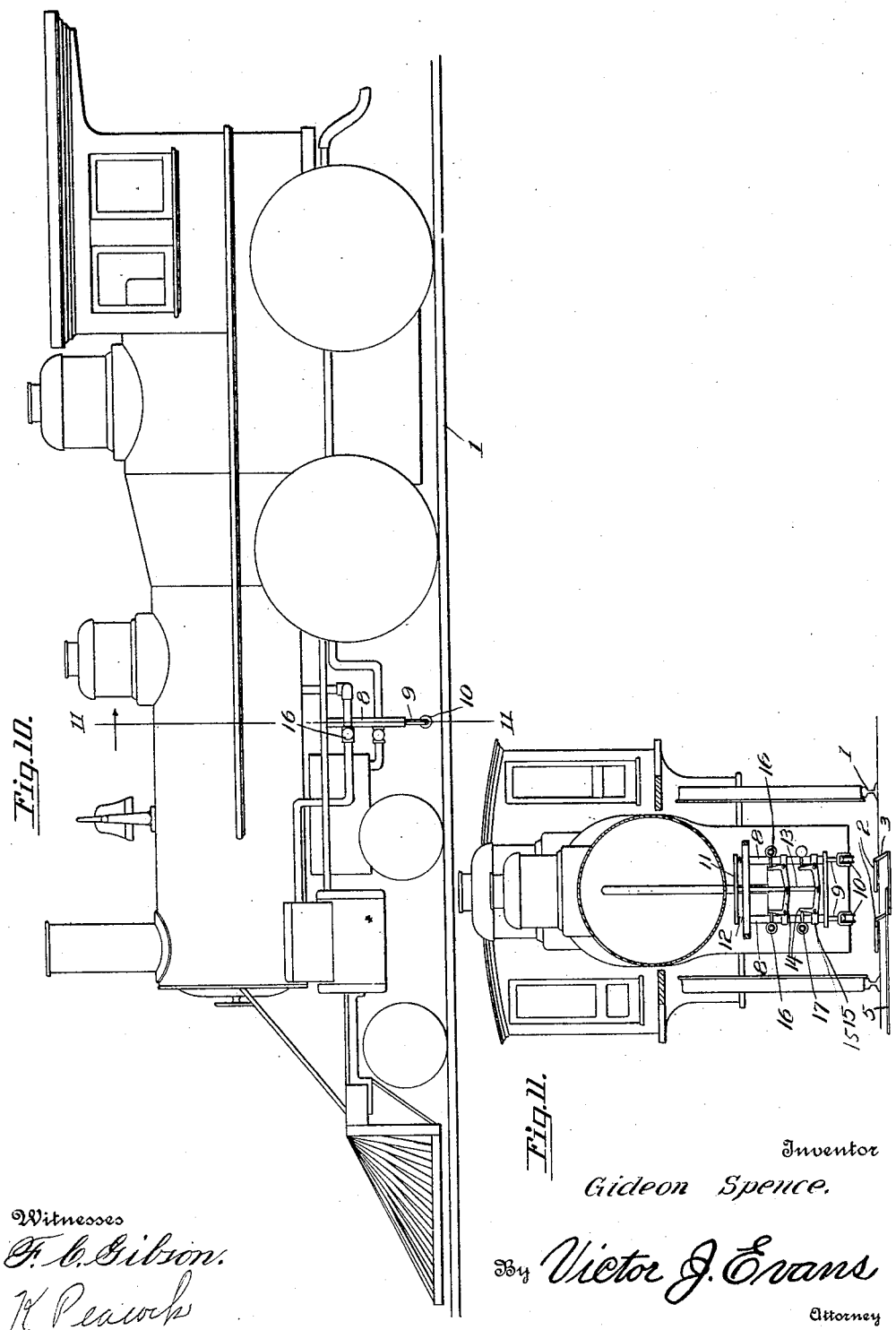

G. SPENCE.
SAFETY RAILWAY APPLIANCE.
APPLICATION FILED DEC. 8, 1916. RENEWED SEPT. 23, 1919.
1,325,419.
Patented Dec. 16, 1919.
8 SHEETS—SHEET 6.
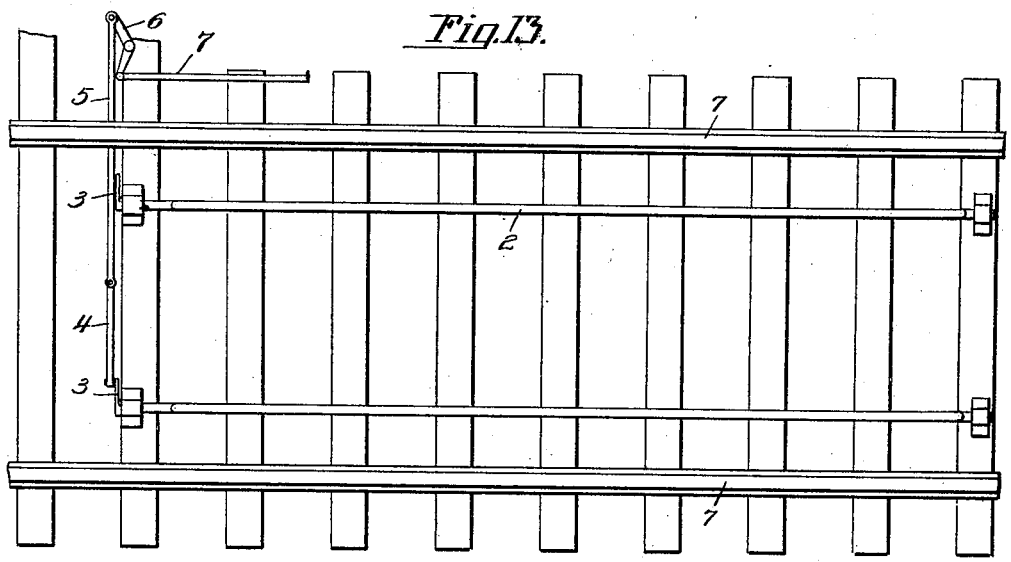
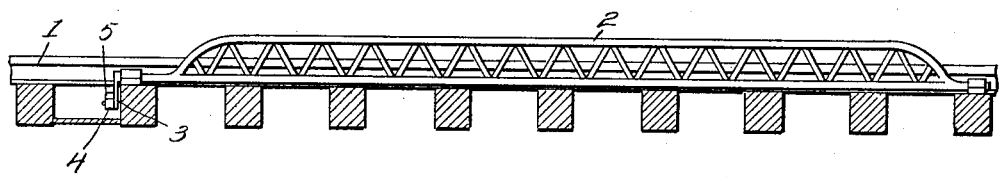
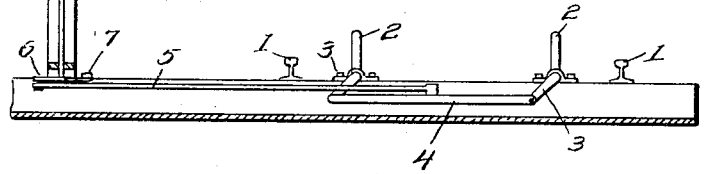
Witnesses
F. C. Gibson.
K. Peacock
Inventor
Gideon Spence.
By Victor J. Evans
Attorney

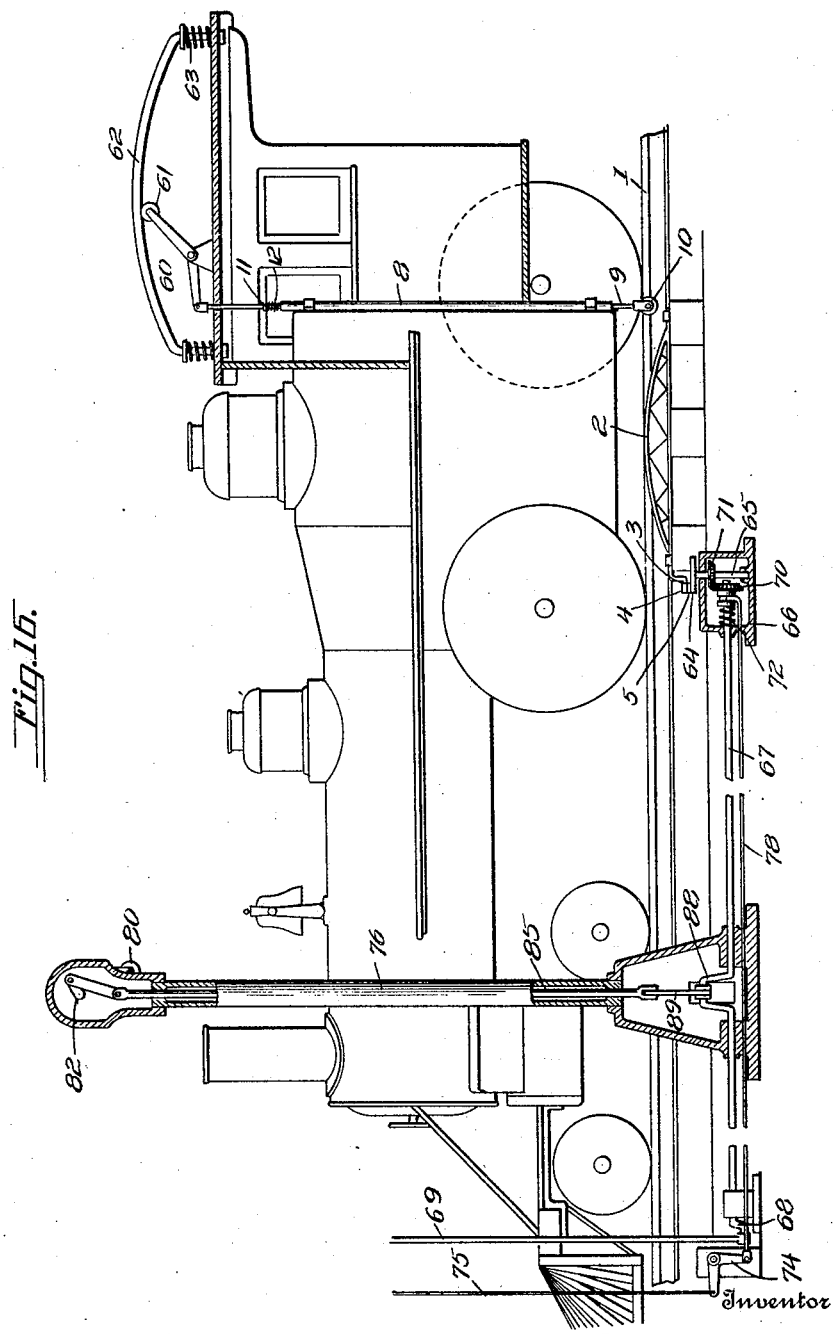

G. SPENCE.
SAFETY RAILWAY APPLIANCE.
APPLICATION FILED DEC. 8, 1916. RENEWED SEPT. 23, 1919.
1,325,419.
Patented Dec. 16, 1919.
8 SHEETS—SHEET 8.
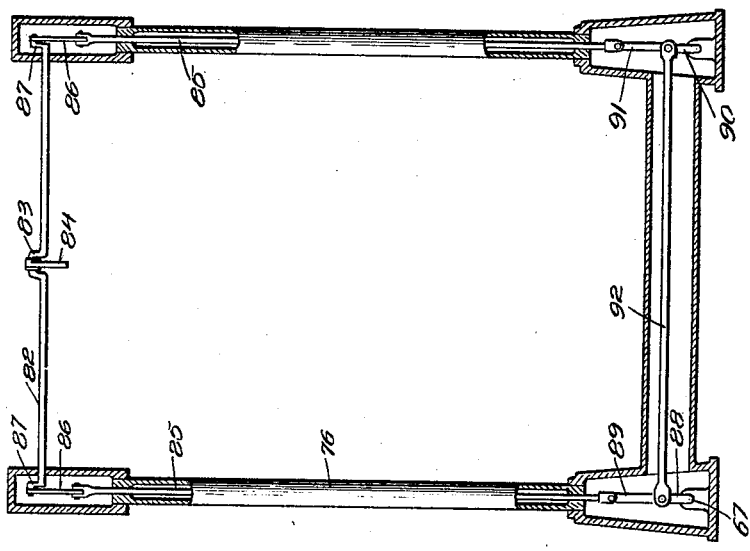
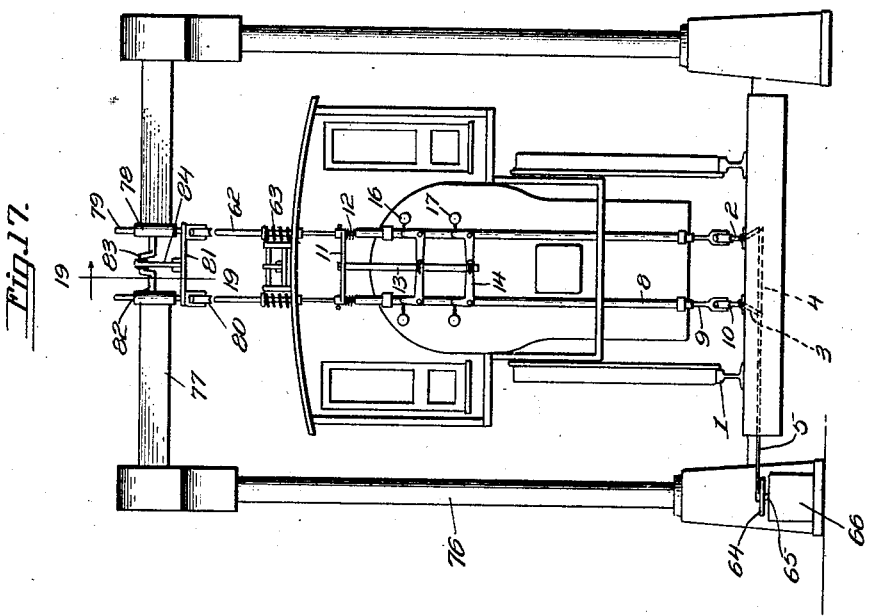
Inventor
Gideon Spence.
Witnesses
F. L. Gibson.
By Victor J. Evans
Attorney

UNITED STATES PATENT OFFICE.

GIDEON SPENCE, OF NEWPORT, RHODE ISLAND.

SAFETY RAILWAY APPLIANCE.

1,325,419.   Specification of Letters Patent.   Patented Dec. 16, 1919.

Application filed December 8, 1916, Serial No. 135,863. Renewed September 23, 1919. Serial No. 325,817.

*To all whom it may concern:*

Be it known that I, GIDEON SPENCE, a citizen of the United States, residing at Newport, in the county of Newport and State of Rhode Island, have invented new and useful Improvements in Safety Railway Appliances, of which the following is a specification.

This invention relates to train control apparatus and car construction and it consists in the novel features hereinafter described and claimed.

An object of the invention is to provide means for automatically controlling a train to bring the same to a stop in the event that a signal is thrown to danger position. This is brought about by providing means for automatically cutting off the steam at the engine and at the same time turning on the air whereby emergency track brakes are applied.

A further object of the invention is to provide a substantial, durable and comfortable car structure which carries the track brakes hereinbefore referred to in addition to the usual wheel brakes now in general use.

Another object of the invention is to provide a novel and efficient form of track brake having its parts compactly assembled and arranged whereby the brake may be applied to the truck of the car without interference to the proper operation of the truck or the parts mounted thereon.

In the accompanying drawings:—

Figure 1 is a side elevation of an end portion of the car illustrating the particular form of truck and car support and the track brakes mounted upon the trucks.

Fig. 2 is a fragmentary detailed longitudinal sectional view of the same.

Fig. 3 is a plan view illustrating the position of the car wheels and axles and the track brakes.

Fig. 4 is a transverse sectional view of the support for the car body cut on the line 4—4 of Fig. 2 showing the track brake mounted thereon.

Fig. 5 is a sectional view of means for operating the track brake.

Fig. 6 is a similar view of the same means taken at a right angle to the view illustrated in Fig. 5.

Fig. 7 is a top plan view of a block used in the track brake operating mechanism.

Fig. 8 is a side elevation of a shoe employed in the track brake mechanism.

Fig. 9 is a bottom plan view of the same.

Fig. 10 is a side view of a locomotive with one arrangement of valve operating means.

Fig. 11 is a transverse sectional view of the same cut on the line 11—11 of Fig. 10.

Fig. 12 is a detail side elevation of the said valve operating means.

Fig. 13 is a plan view of a portion of the track.

Fig. 14 is a longitudinal sectional view of the same.

Fig. 15 is a transverse sectional view of the same.

Fig. 16 is a side view of a locomotive illustrating a modified arrangement and showing parts in section.

Fig. 17 is a rear elevation of the same.

Fig. 18 is an elevation of the operating means shown in Fig. 17 with parts in section.

Fig. 19 is a detailed sectional view of part of the same cut on the line 19—19 of Fig. 17.

As illustrated in the accompanying drawings the track rails are shown at 1 and ramp frames 2 are pivotally mounted for vertical swinging movement between the said rails. Each ramp 2 is provided at one end with a crank 3 and a bar 4 is pivotally mounted upon the cranks 3 of the adjacent ramps. A rod 5 is pivotally connected with the bar 4 at one end and the other end of the said rod 5 is pivotally connected with one end of a bell crank 6 which is pivoted at the side of the track. A rod 7 is pivotally connected with the other end of the bell crank 6 and may be operatively connected with a semiphore or other signal not shown.

The bar 4 is so connected with the cranks 3 of the ramp frames 2 that when the bar 4 is moved longitudinally the said ramps are simultaneously moved to erect or vertical positions or are simultaneously moved to horizontal positions between the track rails 1. Consequently when the signal at the side of the track is moved to danger position the rod 7 is moved with the signal whereby the bell crank 6 is swung and this in turn moves the rod 5 longitudinally which moves the bar 4 whereby the ramps 2 are swung from a horizontal position to a vertical position between the track rails. On the other hand when the signal at the side of the track is moved to indicate clear track the parts operatively connected with the ramps will swing the ramp frames from vertical to horizontal positions between the track rails 1. Vertically disposed tubes 8 are mounted upon the frame of the engine or other vehicle adapted to travel over the track rails 1 and rods 9 are slidably mounted in the said tubes 8. The rods 9 carry at their lower ends rollers 10 which are adapted to travel upon the upper edges of the ramp frames 2 when the said frames are in vertical positions between the track rails as hereinbefore described. The upper portions of the rods 9 are connected together by a cross head 11 and springs 12 are provided upon the upper and lower portions of the said rods 9 and are adapted to encounter the ends of the tubes 8 when the rods are moved whereby the rods are brought to a state of rest by a cushioning action. When the ramp frames 2 are in vertical positions between the track rails 1 their upper portions extend into the paths of movement of the rollers 10 whereby the rods 9 are moved vertically as hereinbefore indicated. When the ramp frames 2 are in horizontal position between the track rails 1 they are below the paths of movement of the rollers 10 and consequently when the rollers pass over them they are not moved vertically by the said ramp frames.

A bar 13 depends from the intermediate portion of the cross head 11 and the ends of bell cranks 14 are pivotally connected with the lower portion of the said bar 13. The said bell cranks 14 are pivoted upon brackets 15 carried by the tubes 11 and some of the said bell cranks are pivotally connected with steam valves 16 while the other bell cranks are pivotally connected with air valves 17. The steam valves 16 are provided for the purpose of controlling the flow of steam from the boiler of the locomotive to the steam chest and the air valves 17 are provided for the purpose of controlling the flow of air from a source of compression upon the engine or a tank to the track brakes hereinafter to be described.

When the rods 9 are moved vertically in the tubes 8 as hereinbefore described they carry with them the cross head 11 which in turn moves the bar 13. As the said bar 13 moves with the cross head it swings the bell cranks 14 whereby those bell cranks which are operatively connected with the valves 6 close the said valves and consequently steam is cut off from the steam chest of the locomotive and at the same time those bell cranks 14 which are connected with the valves 17 open the valves 17 and permit air to flow from a source of supply to the track brakes whereby the brakes are applied at the time that the steam is cut off from the steam chest. As will be apparent this brings the engine and train to a state of rest upon the tracks 1.

In the drawings an improved passenger coach is indicated at 20. The body of this coach is made of steel and it is suitably ornamented exteriorly and interiorly and provided with appropriate furnishings for the comfort and convenience of passengers.

The opposite ends of the body of the coach 20 are supported upon truck structures of which Fig. 1 is a side elevation of one set. Each set of trucks comprises two units of substantially similar structure one unit being provided with three sets of wheels and axles and the other unit being provided with two sets of wheels and axles. In other words the truck unit 21 is a six wheel truck while the truck unit 22 is a four wheel truck. These truck units are connected together by means of chains 23 and chains 24 connect the said truck units with the body of the coach 20. Chains 25 connect the ends of the truck units 21 and 22 with the body of the coach 20. With the exceptions above mentioned the truck units 21 and 22 are alike. Consequently a description of one will suffice. Each truck unit includes a bed structure 26 having cross plates 27 mounted thereon. Springs 28 are mounted upon the cross plates 27 and a plate 29 is mounted upon the upper ends of the said springs 28. The springs 28 may be of any desired number and arrangement provided they may contract and expand vertically. Springs 30 are mounted upon the plate 29 and support at their upper ends plates 31. The springs 30 may be of any desired number or arrangement provided they may contract and expand vertically. Bearing balls 32 are interposed between the plates 31 and the bottom of the body of the coach 20 whereby the entire truck structure may vibrate beneath the body of the coach without transmitting the vibrations to the said body. The springs 28 are stronger than the springs 30. Plates 33 are supported upon springs 34 which rest at their lower ends upon any suitable part of the said structure 26 and the plates 33 carry journaled rollers 35 which bear against the under side of the bottom of the coach body 20. A pivot pin 26 passes through the bottom of the body of the coach 20 and is also pivotally connected with the bed structure 26 whereby the bed structure 26 may turn below the body of the coach 20 and during this turning movement the rollers 35 travel along the bottom of the body of the coach and consequently the trucks may swing as the coach is passing around a curve in the track. Side rails 37 are secured to the edges of the bed structure 26 and the said side rails are in the form of a succession of arches preferably connected integrally together. The side rails 37 are further provided with portions 38 which are disposed below the bed structure 26 and the said portions 38 are also approximately a succession of arches connected together. Axle boxes 39 are carried by the side rails 37 and are guided in the portions 38 of the said side rails and the said axle boxes receive the ends of the axles 40 in the usual manner. Wheels 41 are mounted upon the axles 40 in the usual manner and are adapted to travel along the track rails 1.

Cylinders 42 are mounted upon the portions 38 of the side rails 37 between the wheels 41 the said cylinders being arranged in pairs and a pair of cylinders being located between the adjacent wheels 41. A piston 43 is slidably mounted in each cylinder 42 and is connected with a piston rod 44 which passes through the lower end of the cylinder. A guide 45 is attached to the lower end of each cylinder 42 and a block 46 is slidably mounted in each guide 45. The lower end of each piston rod 44 is pivotally connected with the intermediate portion of the block 46 immediately below. The blocks 46 are provided with flanges 47 which are secured by means of bolts or other suitable securing devices to shoes 48. Two blocks 46 are attached to each shoe 48 the blocks being positioned in the vicinity of the opposite ends of the said shoe. Each shoe 48 is provided at its longer edges with downwardly disposed flanges 49 which are adapted to travel at the opposite sides of the track rails 1. A spring 50 is located in each cylinder 42 and is interposed between the bottom of the cylinder and the under side of the piston 43 located in the said cylinder. Air pipes 51 connect with the upper ends of the cylinders 42.

Means hereinafter to be explained is provided for permitting air to pass or flow through the pipes 51 and when the air passes through the said pipes it enters the upper portions of the cylinders 42 whereby the pistons 43 are moved in a downward direction against the tension of the spring 50 and the blocks 46 are moved downwardly in the guides 45 and the shoes 48 are brought in contact with the upper portions of the track rails 1. This constitutes the track brake structure. It is of course understood that when the shoes are brought in contact with the track rails the car or train is promptly brought to a stop thereby avoiding accident or the possibility of accident. When the air pressure is cut off from the cylinders 42 the springs 50 lift the pistons 43 and through the rods 44 and blocks 46 raise the shoes 48 to their normal positions and out of engagement with the track rails 1. Air tanks 52 are carried by the truck units and each tank is provided with a valve casing 53. Pipes 54 connect with the casing 53 and extend beyond the ends of the tanks 52. The outer ends of the pipes 54 are connected with the intermediate portions of the pipes 51 hereinbefore described so that when the valves in the valve casing 53 are opened air is permitted to flow from the tanks 52 through the pipes 54 and 51 into the cylinders 42 and operate the pistons 43 as described. An air tank 55 is mounted under the body of the coach 20 and a pipe 56 (see Fig. 1) connects the tank 55 with all of the tanks 52. Any means may be provided for supplying compressed air to the tanks 55 and the air may flow from the tank 55 through the pipe 56 into the tanks 52. The valve 17 hereinbefore described may be operatively connected with the valves in the casing 53 for opening the valves in the casings 53 when the valves 17 are operated or electric means may be mounted on the body of the car for operating the valves in the casing 53 simultaneously or individually as desired and as is the usual practice. Consequently the valves in the casing 53 may be operated automatically or manually and in either instance the air is permitted to flow from the tanks 52 to the cylinders 42 and the shoes are applied to the track rails as hereinbefore described. The body of each coach 20 is provided at its top with suitable ventilators 53.

In the arrangement as shown in Figs. 16 to 19 inclusive an overhead mechanism for operating the valves is provided in conjunction with means hereinbefore described for operating the said valves and which is located between the track rails.

The rods 9 are extended through the top of the cab of the locomotive and are connected at their upper ends with bell crank levers 60 fulcrumed upon the top of the cab. The levers 60 carry at their upper ends rollers 61 which bear against the undersides of the ramps 62 movably mounted at the top of the cab. Springs 63 are interposed between the ends of the said ramps and the top of the cab and serve to cushion the vertical movement of the ramps.

The rod 5 is pivotally and eccentrically connected with a disk 64 which is mounted at the upper end of a shaft 65 journaled in a casing 66. A shaft 67 is also journaled in the said casing and is provided at one end with a crank 68 upon which is pivoted one end of a rod 69. The said rod 69 leads to the operator's tower (not shown.)

A beveled gear wheel 70 is splined on the shaft 67 and is adapted to engage a similar gear wheel 71 fixed to the shaft 65. A spring 72 is interposed between the gear wheel 70 and a side of the casing 66 and is under tension with a tendency to hold the gear wheel 70 in engagement with the gear wheel 71. A rod 73 is connected at one end with the hub of the gear wheel 70 and at its other end is pivotally connected with one arm of a bell crank lever 74. An operating rod 75 is connected with the said lever 74 and extends to the operator's tower hereinbefore referred to.

Consequently it will be seen that when the rod 69 is moved longitudinally the shaft 67 is turned. The operator in the tower may move the rod 75 whereby the rod 73 is moved longitudinally and the gear wheel 70 is permitted to engage the wheel 71. When the said gear wheels are in engagement with each other and the shaft 67 is turned the shaft 65 is turned whereby the bar 5 is moved longitudinally and the ramps 2 are swung. In the event that the said ramps 2 should be temporarily inoperative owing to the track being covered with snow or from any other cause the rod 73 may be moved longitudinally whereby the wheel 70 is carried out of engagement with the wheel 71 and the shaft 67 may be turned for lowering overhead mechanism adapted to encounter the ramps 62 as the locomotive passes under the said operating means.

Posts 76 are mounted beyond the sides of the track rails 1 and arms 77 are carried at the upper ends of the said posts. The arms 77 are provided at their inner ends with vertically disposed bearings 78. Rods 79 are slidably mounted in the said bearings 78 and carry at their lower ends rollers 80 which when lowered are adapted to be encountered by the ramps 62. A bar 81 connects the rods 79 together. A shaft 82 is journaled in the upper portions of the post 76 and the said shaft is provided at a point between its ends with a crank 83. A bar 84 is pivotally connected at one end with the intermediate portion of the crank 83 and pivotally connected at its other end with the intermediate portion of the bar 81. Consequently it will be seen that when the shaft 82 is turned the bar 84 is moved longitudinally whereby the bar 81 and the rods 79 are moved in a downward direction and the rollers 80 are positioned into the paths of movement of the ramps 62. Rods 85 are slidably mounted in the post 76 and links 86 operatively connect the upper ends of the rods 85 with cranks 87 provided at the ends of the shaft 82.

The shaft 67 hereinbefore described is provided with a crank 88 and a link 89 is pivotally connected at one end with the crank 88 and is pivotally connected at its other end with the lower end of one of the rods 85. A crank 90 is journaled in the base of that post opposite the post 76 which receives the link 89 and a link 91 is pivotally connected with the crank of the shaft 90 and also pivotally connected with the other rod 85. A rod 92 is pivotally connected at one end with the crank 88 and pivotally connected at its other end with the crank of the shaft 91 and extends transversely under the track rails 1. Consequently it will be seen that the rods 85 move simultaneously as the shaft 67 is turned.

From the above description taken in conjunction with the accompanying drawings it will be seen that a simple and efficient apparatus is provided for controlling a train and a novel and improved car structure is provided.

Having described the invention what is claimed is:—

1. In a train control, a ramp movably mounted adjacent tracks, an engine mounted for movement along the track, a tube carried by the engine, a rod slidably mounted in the tube, a roller journaled upon the rod and adapted to encounter the ramps, a cross head attached to the rod, a bell crank lever fulcrumed upon the tube and operatively connected with the cross head and a steam controlling valve operatively connected with said bell crank lever.

2. A train control comprising a track and a vehicle mounted for movement thereon, ramps movably mounted along the track, a vertically movable ramp on the vehicle, a vertical rod carried by the vehicle, means for slidably supporting said rod, a roller at the lower end of said rod adapted to engage with the track ramps, a bell crank lever connected with the upper end of the rod and having one end engaging the ramp on the vehicle, valve operating means connected with said rod, an obstruction along the track for engaging the ramp on the vehicle and means for actuating said obstruction and the track ramps.

3. A train control comprising a track and vehicle mounted for movement thereon, ramps movably mounted along the track, a vertical rod, means for slidably connecting the same with the vehicle, a roller on the lower end of said rod engaging with the track ramps, a vertically movable ramp on the vehicle, and a bell crank engaging with the last mentioned ramp and having one end connected with the rod, valve control means connected with said rod, an obstruction located along the track, means for actuating said obstruction and the track ramps and means for disconnecting the operating means from the track ramps, when desired.

In testimony whereof I affix my signature in presence of two witnesses.

GIDEON SPENCE.

Witnesses:
P. P. STEWART HALE,
FRANK J. MORGAN, Jr.